(No Model.) 5 Sheets—Sheet 3.
W. B. COWLES.
HYDRAULIC MECHANISM FOR CLOSING BULKHEAD DOORS.
No. 605,399. Patented June 7, 1898.
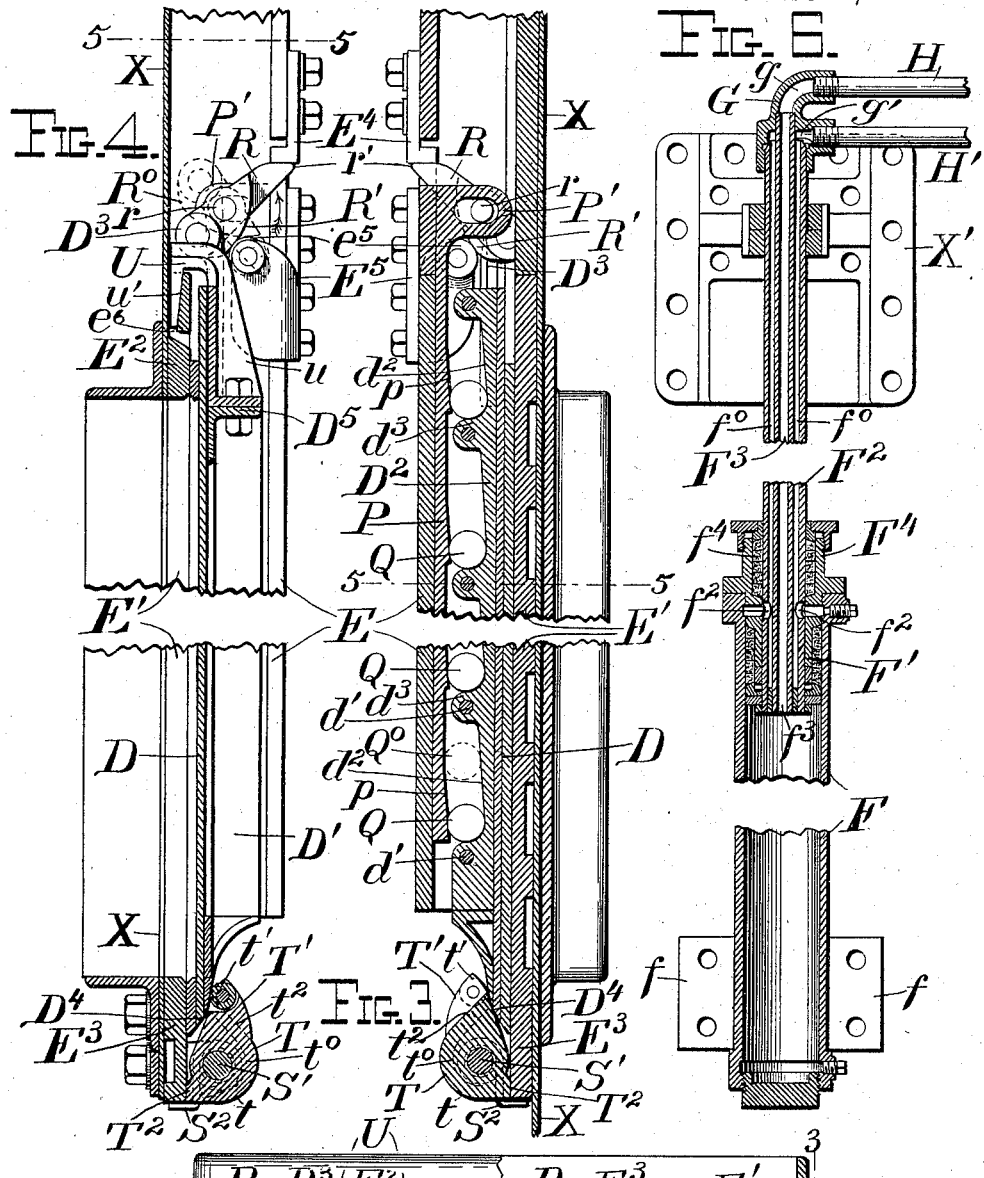
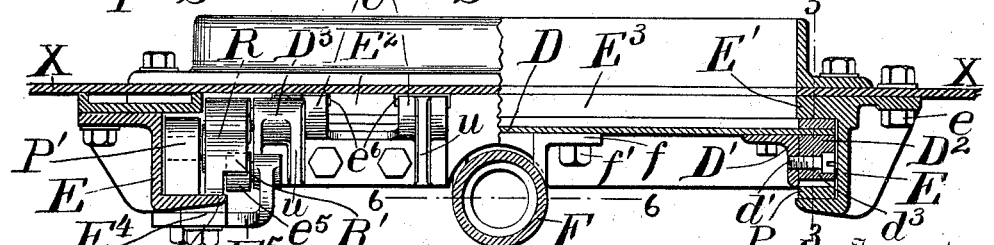
Witnesses
Percy C. Bowen
John C. Wilson
Inventor
W. B. Cowles,
by Whitman & Wilkinson,
Attorneys.

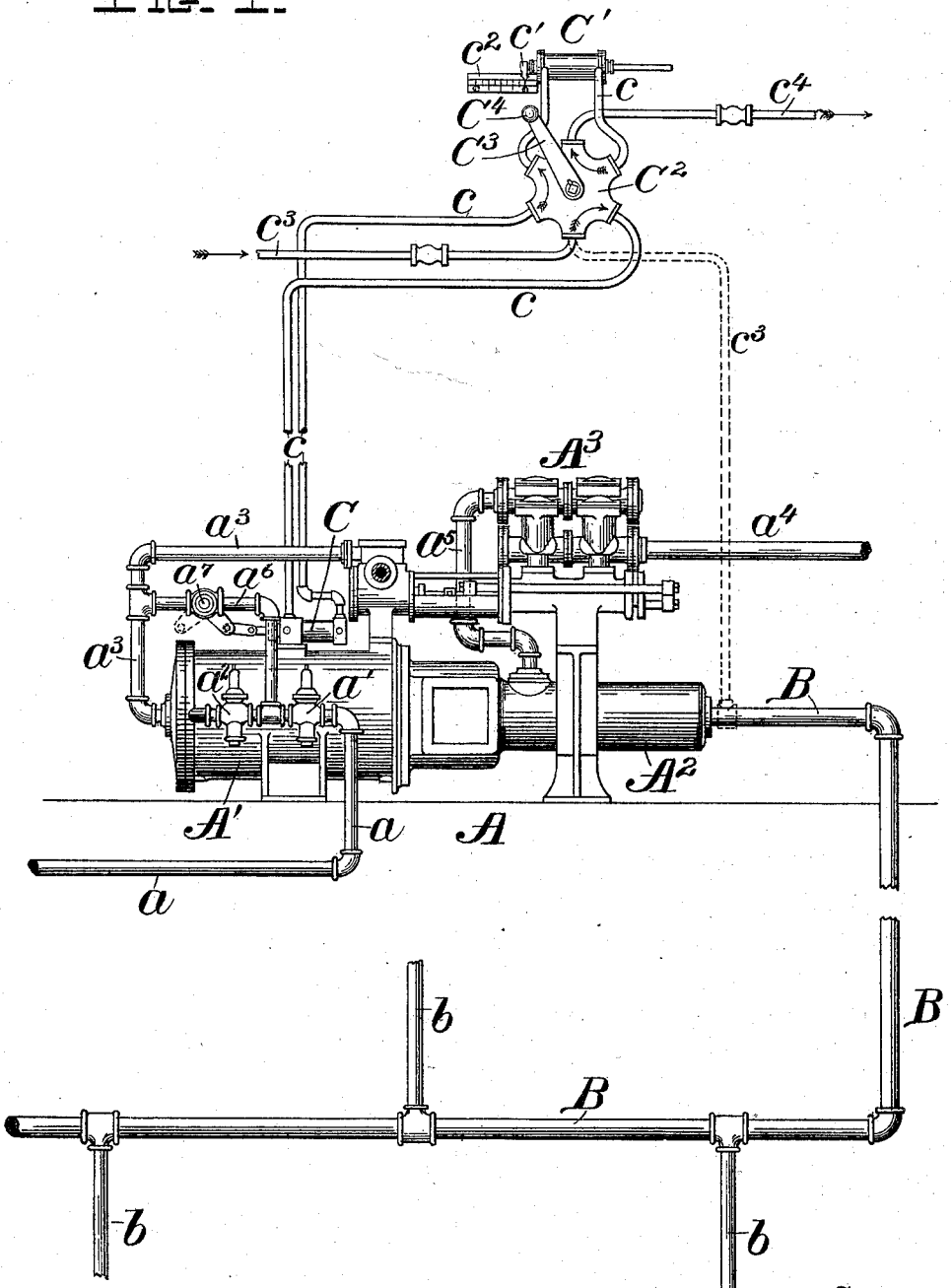

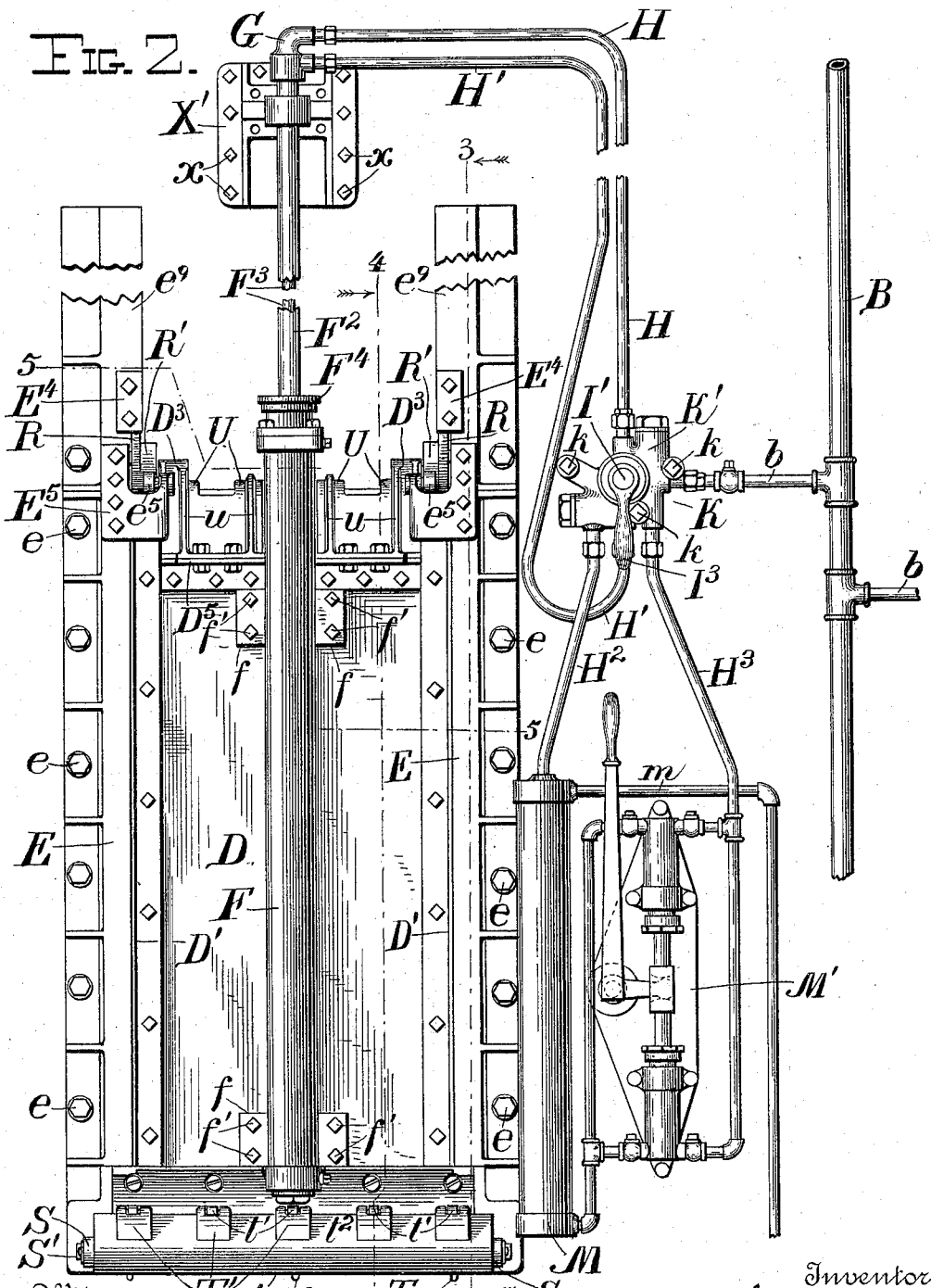

(No Model.) 5 Sheets—Sheet 4.

W. B. COWLES.
HYDRAULIC MECHANISM FOR CLOSING BULKHEAD DOORS.

No. 605,399. Patented June 7, 1898.

Witnesses
Percy C. Bowen
John C. Wilson

Inventor
W. B. Cowles,
by Whitman & Wilkinson,
Attorneys.

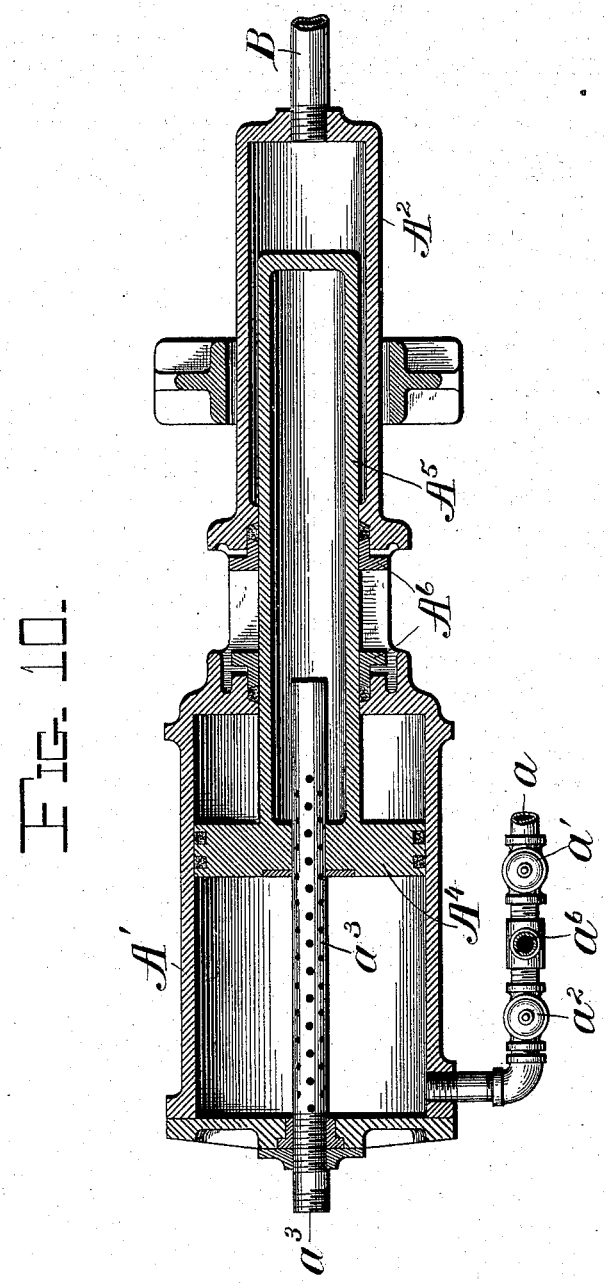

UNITED STATES PATENT OFFICE.

WILLIAM BARNUM COWLES, OF CLEVELAND, OHIO.

HYDRAULIC MECHANISM FOR CLOSING BULKHEAD-DOORS.

SPECIFICATION forming part of Letters Patent No. 605,399, dated June 7, 1898.

Application filed May 22, 1897. Serial No. 637,748. (No model.)

*To all whom it may concern:*

Be it known that I, WILLIAM BARNUM COWLES, a citizen of the United States, residing at Cleveland, in the county of Cuyahoga and State of Ohio, have invented certain new and useful Improvements in Hydraulic Systems for Closing Bulkhead-Doors, &c.; and I do hereby declare the following to be a full, clear, and exact description of the invention, such as will enable others skilled in the art to which it appertains to make and use the same.

My invention relates to improvements in apparatus for opening and closing bulkhead-doors, hatches, ports, valves, gates, and other such devices, and while designed especially for use on shipboard it may be used advantageously in factories, large buildings, or any other place where such a system is necessary or desirable.

The objects of my invention are, first, to construct an apparatus which shall be simple, durable, positive in its action, reliable, and not likely to get out of order, by means of which a series of mechanical devices situated at a distance from the operating-point may be all operated simultaneously in case of an emergency; second, to provide a system in which the power for operating a number of mechanical devices will be supplied to the said devices through a single main pipe and will be maintained at a predetermined pressure therein, and, third, to provide means at each device to be operated whereby the said device may be controlled at will.

Reference is had to the accompanying drawings, in which the same parts are indicated by the same letters throughout the several views.

Figures 7, 8:
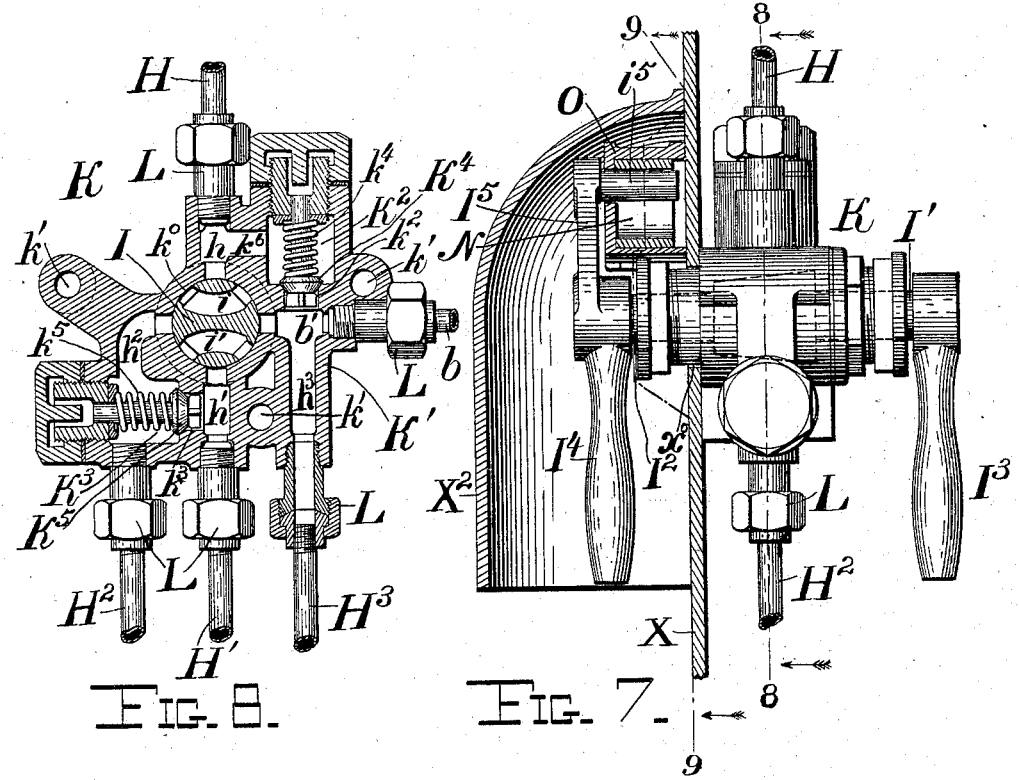
Figure 9:
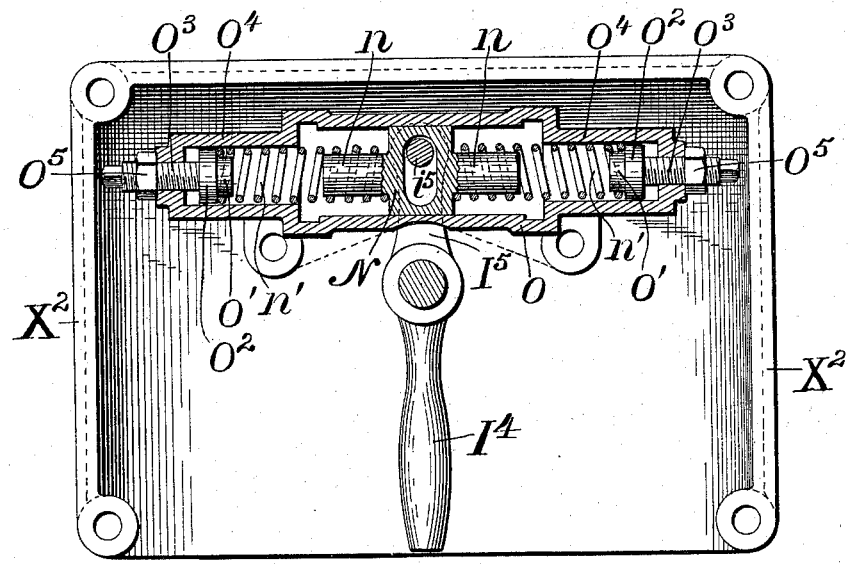

Figure 1 represents a diagrammatic view of the primary system connected to an accumulator for supplying fluid-pressure to the main line and its branches. Fig. 2 represents a front elevation of a vertically-sliding bulkhead-door with my improved means for opening and closing the same applied thereto. Fig. 3 represents a vertical section made by the plane 3 3 of Figs. 2 and 5, showing the means for tightening the door upon its seat. Fig. 4 represents a section made by the plane 4 4 of Fig. 2, and further illustrates the means for tightening the door upon its seat. Fig. 5 represents a horizontal section through the door and the closing and tightening devices thereof made by the plane 5 5 of Figs. 2 and 3. Fig. 6 represents a vertical section through the cylinder, piston, and hollow piston-rod made by the plane 6 6 of Fig. 5. Fig. 7 represents a side elevation of the operating-valve at the door, parts being shown in section. Fig. 8 represents a section through the operating-valve made by the plane 8 8 of Fig. 7; and Fig. 9 represents a section through the automatic shut-off device on the said valve, taken on the line 9 9 of Fig. 7. Fig. 10 represents a horizontal section through the axis of the accumulator, parts being shown in elevation.

Referring now more particularly to Fig. 1, A represents a steam or other fluid pressure accumulator of any well-known form, A' being the steam or other fluid pressure cylinder and $A^2$ the ram-cylinder thereof. This accumulator may be called the central station or source of power and control, hereinafter referred to.

Steam or other fluid pressure is supplied to the steam-cylinder A' through a pipe *a* from any suitable source. For convenience of description the pipe *a* and cylinder A' will be hereinafter called the "steam-pipe" and "steam-cylinder," although any other suitable fluid under pressure, such as compressed air, may be admitted to the same. This pipe is preferably provided with reducing-valves $a'$ and $a^2$ before entering the steam-cylinder. The first reducing-valve $a'$ is set to reduce the steam-pressure to a predetermined limit—as, for instance, a pressure of one hundred pounds to the square inch, and the second reducing-valve is set to reduce the steam-pressure to about one-half the pressure allowed to pass through the first valve, or about fifty pounds to the square inch, which latter is the usual pressure for working the system.

The accumulator-pumps $A^3$ are supplied with steam through a pipe $a^3$ from the interior of the steam-cylinder A', and the supply of steam to the pumps may be automatically regulated in any well-known way. This pipe $a^3$ is preferably perforated, as shown in Fig. 10, and projects through suitable packing in the piston $A^4$, the advantages of which arrangement are well known in the art and form no part of my present invention. These pumps $A^3$ when in operation are supplied with fluid through the pipe $a^4$, which fluid is forced through the pipe $a^5$ into the ram-cylinder $A^2$, whence it is forced through the distributing-main B and its branches $b$ to the several doors or other devices to be operated, as shown in Fig. 2.

The steam-piston $A^4$ has a hollow piston $A^5$, which passes through the packing-glands $A^6$ and enters the ram-cylinder $A^2$, and as the said hollow piston-rod is forced into the ram-cylinder the pressure of the fluid in the ram-cylinder $A^2$ will be equal to the pressure of the steam multiplied by the area of the steam-piston $A^4$ and divided by the area of the closed end of the hollow piston-rod $A^5$, thus neglecting leakage and friction.

A branch pipe $a^6$ leads from the steam-pipe $a$, between the two reducing-valves $a'$ $a^2$, to the pipe $a^3$, thus serving as a "by-pass" from between the reducing-valves to the cylinder and pumps.

A valve $a^7$ is placed in the pipe $a^6$, and when this valve is closed the steam entering the cylinder and pumps must pass through both of the reducing-valves $a'$ and $a^2$, where its pressure is reduced in two steps to the usual working pressure. When the valve $a^7$ is open, the steam will be admitted to the cylinder and pumps at the pressure with which its leaves the first reducing-valve, thus immediately increasing, generally doubling, the fluid-pressure in the main B and its branches $b$. The object of increasing or doubling the pressure in the main B is to close all the bulkhead-doors at once, as in case of accident to the ship or in any other emergency, and the means for closing the said doors by this increase of pressure will be hereinafter described. The valve $a^7$ is opened or closed by means of a power-cylinder C, which forms a part of a primary system, such as is shown and described in Letters Patent of the United States granted to me July 21, 1896, No. 564,474, and may be briefly described as follows:

The two cylinders C and C' of equal piston displacement are connected with each other by the pipes $c\ c$, which pass through the six-way valve $C^2$, located in the circuit between said cylinders. These cylinders and pipes are filled with fluid under pressure from the supply-pipe $c^3$, connected either to the ram-cylinder $A^2$, as shown in dotted lines in Fig. 1, or to any other source of fluid-pressure. $c^4$ represents the discharge-pipe. The piston of the cylinder C is connected with the lever of the valve $a^7$, and when this piston is operated to open or close the said valve the fluid forced from one end of its cylinder will cause a corresponding travel of the piston in the cylinder C', which travel may be indicated by a pointer $c'$, attached to the piston-rod and moving over a scale $c^2$. The six-way valve $C^2$ is provided with a lever $C^3$ and handle $C^4$, by means of which the valve may be turned to admit fluid-pressure to either end of the power-cylinder C to open or close the valve $a^7$, the piston in the telltale-cylinder C' moving at the same time to indicate that the power-cylinder is doing its work.

The primary system just described constitutes the emergency portion of the whole system. The six-way valve $C^2$ is placed on the bridge, in the conning-tower, or in any other suitable place, and when it is desired to close all the doors a simple movement of the lever $C^3$ will cause the power-cylinder C to open the valve $a^7$ and throw the double pressure into the main B and its branches and close all the bulkhead-doors, as will now be described.

In Fig. 2 of the drawings I have illustrated a vertically-sliding bulkhead-door as the preferred form of door for use with the present system, but it will be obvious that this system may be readily adapted to operate various forms of doors, gates, ports, or valves other than those herein specifically described.

D represents the door which slides vertically in the ways or guides E, bolted, as at $e$, to the bulkhead X, and has secured thereto the seat E', against which the inner side of the door is adapted to be pressed when the door is closed. A cylinder F is secured to the door D, as by means of the plates $f$ and bolts $f'$, and extends the whole length of and a little above the door. Within this cylinder is arranged a hollow piston F', from which a hollow piston-rod $F^2$ extends through the upper cylinder-head $F^4$, which is provided with the usual packing $f^4$, and the said pipe is secured to the bulkhead some distance above the door by the bracket and socket X', which latter is bolted to the bulkhead, as at $x$. The hollow piston-rod $F^2$ opens into the cylinder above the piston through the vents or ports $f^2$. Within the hollow piston rod or pipe $F^2$ is arranged a smaller pipe $F^3$, leaving an annular space $f^0$ between the inner and outer pipes, and the latter pipe $F^3$ extends through the piston and opens into the lower part of the cylinder, as at $f^3$. The upper ends of the two pipes $F^2$ and $F^3$ are secured in a double elbow G, (shown best in Fig. 6,) which also receives the ends of the two pipes H H', which convey the fluid-pressure to the cylinder F and conduct the fluid from the pipe H through a passage $g$ to the inner pipe $F^3$ and the fluid from the pipe H' through the passage $g'$ to the outer pipe $F^2$. Thus when the fluid under pressure is admitted to the pipe H it will pass through the inner pipe $F^3$ to the lower part of the cylinder F, thus forcing the said cylinder down and causing the door which is secured to the cylinder to close. While if fluid be admitted through the pipe H' and not through the pipe H it will enter the cylinder F above the piston-rod and will raise the door. The flow of fluid through the pipes H H' is controlled by the operating-valve K and the parts connected thereto, and shown in Figs. 2, 7, 8, and 9 of the drawings. This operating-valve K consists of a casing K', bored out in the direction of its axis to form the valve-chamber $k^0$, to receive the valve-plug I, which latter is made to fit snugly in the valve-chamber $k^0$. One end of the casing K' is fitted water-tight within the opening $x^0$ in the bulkhead X, and the casing is held to the bulkhead by bolts $k$, passing through bolt-holes $k'$ in the casing.

The ends of the valve-plug I have spindles or stems I' and $I^2$ extending through stuffing-boxes and provided with handles $I^3$ and $I^4$, one on each side of the bulkhead, by means of which the valve-plug can be turned to open or close the door from either side.

The several pipes are connected to the casing by the couplings L. The pipes H and H' enter opposite sides of the casing, respectively, and open into passages $h$ $h'$, leading to the valve-chamber $k^0$. The branch pipe $b$ from the pressure-main B enters through its coupling L and opens into the passage $b'$ in the valve-casing leading into the valve-chamber $k^0$ at right angles to the openings $h$ $h'$. The exhaust-passage $h^2$ opens into the valve-chamber $k^0$ on the opposite side to the passage $b'$ and communicates with the exhaust-pipe $H^2$, which is connected by its coupling L to the lower side of the casing K' on one side of the pipe H'. On the other side of the pipe H' a pipe $H^3$ opens into a passage $h^3$ in the valve-casing leading into the passage $b'$. The pipe $H^2$ leads to a reservoir M, into which the fluid from the cylinder F is discharged after having done its work, and this reservoir M is provided with an overflow-pipe $m$, leading to the bilge or to any other convenient place. The pipe $H^3$ leads to an auxiliary source of supply, such as a hand-pump M' of any suitable construction, which may be used to force the fluid from the reservoir M through the pipe $H^3$ and valve K to the cylinder F to open or close the door by hand-power from either side of bulkhead should the main line become disabled.

The valve-plug I is provided with two ports or passages $i$ $i'$, which open through the sides of the valve-plug, the said openings being at a distance of ninety degrees apart, as shown in Fig. 8 of the drawings, so that when the plug is turned to one position one of the ports, as $i$, will form a communicating passage between the passages $b'$ and $h$, and the other port $i'$ will form a communicating passage between the passage $h'$ and $h^2$. In this position the fluid from the main B will pass through the pipes H and $F^3$ to the lower part of the cylinder to close the door, while the fluid from the upper part of the cylinder will escape through the pipes $F^2$ and H', the passage $h'$ in the valve-casing, the port $i'$ in the valve, and the passage $h^2$ to the exhaust-pipe $H^2$, and thence to the reservoir M. When the plug is turned the other way, the passage $b'$ from the main B will be opened into the passage $h'$, so that the fluid will pass through the pipes H' and $F^2$ to the top of the cylinder above the piston F' and thus force the said cylinder upward and open the door, the fluid from the lower part of the cylinder passing through the pipes $F^3$ and H, the passage $h$, port $i$, and passage $h^2$ to the exhaust-pipe $H^2$ and reservoir M.

The handle $I^4$, on the opposite side of the bulkhead from the casing K, is provided with an extension $I^5$, carrying a pin $i^5$, which extends into a slotted block N, arranged to slide in a suitable casing O, secured to the bulkhead.

The block N is provided with a stud $n$ on each side, forming supports for the ends of two coiled springs $n'$ $n'$, which tend to press the block N toward the middle of its stroke. These springs are preferably supported at their opposite ends on studs O' O', projecting from disks $O^2$ $O^2$, which latter are swiveled on the ends of compression-screws $O^3$ $O^3$, which pass through the ends of the reduced portions $O^4$ $O^4$ of the casing O, and the said compression-screws are provided with lock-nuts $O^5$ $O^5$. By means of the said compression-screws the springs $n'$ $n'$ may be so adjusted as to balance each other when the block is in the middle of the casing, which will hold the lever $I^4$ in a vertical position, as shown in Fig. 9. This position of the lever $I^4$ will hold the valve-plug I in the position shown in Fig. 8, with the passages $b'$, $h$, $h'$, and $h^2$ closed, which position will prevent any fluid from passing into or out of the cylinder F, and thus hold the door in the locked position, whether opened, closed, or only partly open.

When the handles are turned to open the valve to admit fluid to the cylinder, the block N will be moved against the tension of one or the other of the springs $n'$ $n'$, and when the said handle is released the spring which has been compressed will push the said block back to its middle position, where it will balance between the two springs, thus closing the valve.

The foregoing description shows the effect of moving the valve-plug I by hand; but to provide for the operation of the system from the central station, as by the lever $C^3$, the valve-casing is provided with two chambers $K^2$ and $K^3$, one of which, $K^2$, communicates with the passage $b'$ through an opening $k^2$, which opening is kept normally closed by a check-valve $K^4$, held upon its seat by a spring $k^4$, the tension of which spring is sufficient to hold the said check-valve closed against the usual pressure in the main B and its branches $b$, but is not strong enough to resist increased pressure should it be turned on in case of emergency. A passage $k^6$ connects the chamber $K^2$ with the passage $h$, so that should the increased pressure be turned on while the valve K is closed the check-valve $K^4$ would be forced open and the increased fluid-pressure would pass through the chamber $K^2$ to the pipe H and thence to the cylinder F and close the door. The chamber $K^3$ communicates with the passage $h'$ through an opening $k^3$, closed by a check-valve $K^5$, held upon its seat by a spring $k^5$, which spring is strong enough to hold the check-valve closed against the usual pressure in the system, but not strong enough to resist the increased pressure when thrown on, so that when the increased pressure is exerted in the lower end of the cylinder to close the door the increased pressure in the exhausting end of the cylinder will force the check-valve $K^5$ open and allow the exhaust fluid to pass into the chamber $K^3$, which is open to the exhaust-pipe $H^2$, as shown in Fig. 8.

From the foregoing it will be seen that the normal position of the valve-plug I is as shown in Fig. 8—i. e., with all its ports closed—thus holding the door from movement. When it is desired to open or close the door, one of the handles $I^3$ or $I^4$ is turned to the right or left, as the case may be, thus admitting the pressure to the cylinder F to open or close the door. Upon the release of the handle the valve will be closed by the action of the springs $n'$ $n'$ and will hold the door from movement; but should it be desirable to close all the doors in case of an emergency the increased fluid-pressure is turned on at the accumulator, as hereinbefore described, and this will force the check-valve $K^4$ open and, passing to the cylinders F, will close the doors, the exhaust-pressure forcing the check-valves $K^5$ open and escaping therethrough.

Should it be necessary to check the movement of one or more of the doors or to open one while being closed by the increased pressure, to allow the attendants to escape from the compartment, one of the handles $I^3$ or $I^4$ may be turned in the usual direction for opening the door and held in this position. This will open the ports in the valve-plug I and will turn the whole pressure into the upper end of the cylinder F to open the door. During this short interval for liberating an attendant caught by the emergency closing action a slight amount of fluid will escape through the valves $K^4$ and $K^4$, for both at this time have their upper sides in connection with the overflow-pipe $H^2$, but this cannot prevent at least the ordinary pressure being available to open the door and the slight amount of waste fluid can do no harm. When the attendants have all passed from the compartment, if the handle be released or be turned in the opposite direction this will turn the whole pressure into the lower end of the cylinder, and the door will be closed. A case $K^2$ is secured to the inside of the bulkhead over the handle $I^4$ to prevent the contents of the compartment from injuring or interfering with the said handle. This is especially desirable for coal-bunkers or compartments in which freight is packed.

The seat E' at the sides of the opening in the bulkhead forms a part of the guides E, and the seat-pieces $E^2$ and $E^3$ at the top and the bottom of the door may or may not be formed integral therewith, and the whole seat is bolted securely to the bulkhead to form, with the door, a water-tight joint.

A flange D' is bolted to each side of the door D, and to the outer side of each of the said flanges is secured, by screws or otherwise, a strip $D^2$, having a series of bevels $d^2$, which terminate at their lower ends in shoulders or lugs $d^3$, through which lugs the screws $d'$ are passed to hold the strips to the flanges.

Within the guides E, opposite to the strips $D^2$, are arranged corresponding strips P, having bevels $p$ opposite to the bevels $d^2$ of the strip $D^2$. The strips P are arranged to slide vertically in the guides E and are provided with slotted lugs P' at their upper ends, into the slots of which project pins $r$ from toes R, which toes are pivoted to brackets $D^3$, bolted to the door and extending slightly above the same.

The toes R have their ends beveled, as at $r'$, to engage the under side of adjustable stops $E^4$, bolted to the guides E. On one side of the toes E are formed cams R', which are adapted to engage rollers $e^5$, journaled in brackets $E^5$, bolted to the guides E in such a position that the rollers will be just above the top of the door when the latter is closed. The pivoted toes R hang in the position shown by the dotted lines $R^0$ in Fig. 4 during all upward or downward movement of the door outside of the short tightening interval at the extreme bottom end of travel, and the toes R are held in this position by the beveled ends $r'$ bearing against and sliding under the projecting lips $e^9$ of the upper guides. When the door descends to the tightening interval, the beveled ends $r'$ pass below the projecting lips of the upper guides and below the adjustable stops $E^4$, and the toes R are caused to swing outwardly and upwardly in the direction of the arrow by the cams R' engaging the rollers $e^5$ until the beveled ends $r'$ bear on the adjustable stops $E^4$, at which time the door is completely closed and tightened. When the door ascends from its closed position, the above-described operation of the toes R is reversed, the beveled ends $r'$ being held by the stops $E^4$ until the toes are swung into the dotted position $R^0$, at which time the door is entirely released and free from the action of the tighteners. During the tightening interval, while the door is either descending or ascending, as above described, the pins $r$ remain nearly stationary and hold the strips P stationary on the guides E. After the door has been released and the toes R have assumed the position shown in dotted lines at $R^0$ the said toes and the strips P will travel with the door.

Rollers or balls Q are placed between the bevels $p$ and $d^2$, as shown in Fig. 3, and during the tightening interval, as the door and strip $D^2$ descend, the strip P being held by the action of the toe R, the rollers Q will tighten between the two bevels $p$ and $d^2$, and thus force the door tightly against its seat at the sides. Should there be a small obstruction between the door and its seat, the rollers would not fall so low in the space between the two bevels, but would remain in about the position shown in dotted lines at $Q^0$ in Fig. 3, but in any event will tend to force the door closely against its seat.

When the door is forced home, the end $r'$ of the toe R will rest beneath the stop $E^4$, as shown in Figs. 3 and 4. When the door begins to move upwardly, the end $r'$ of the toe R, being retained beneath the stop $E^4$, will hold the strip P down, the said toe turning about the pin $r$ as a pivot until the parts assume the position shown in dotted lines in Fig. 4, by which time the rollers Q will have been carried above the bevels $p$ by the lugs $d^3$, which will release the door and allow it to slide freely in the guides E.

Journaled in suitable lugs S on the lower seat-piece $E^3$ is a shaft $S'$, on which is mounted a flap-piece T, which is rounded at the lower outer edge $t$ and bent inwardly at the top, as at $t^2$, to lie close against the seat-piece $E^3$ when the door is open. One or more springs $S^2$ are coiled around the shaft $S'$ in suitable recesses formed for that purpose in the flap-piece T, (indicated by the dotted line $t^0$ in Figs. 3 and 4,) one end of each spring being secured to the flap-piece and the other end being bent under the seat-piece $A^4$, so as to press the flap-piece against the seat-piece when the door is open. This prevents the collection of dirt, coal, or other solid matter at the base of the doorway, which would prevent the door from being forced down on its seat.

Arranged at intervals along the upper side of the flap-piece T are lugs or toes $T'$, which also press against the seat-piece $E^3$ when the door is open, and journaled in these toes $T'$ are rollers $t'$.

The lower edge of the door is beveled, as at $D^4$, to form a wedge, which when the door descends will enter between the rollers $t'$ and the seat-piece $E^3$, and thus force the rollers and flap-piece T outwardly against the tension of the springs $S^2$, allowing the wedge-shaped bottom $D^4$ of the door to enter behind the said flap-piece. The flap-piece T is provided with a rib $T^2$ along its lower inner edge, which when the door has entered behind the upper portion of the flap-piece will strike the bottom of the seat-piece $E^3$, preventing further movement of the upper portion of the flap-piece, thus pressing the lower portion of the door firmly against the lower seat-piece $E^3$. In place of the rib $T^2$ a series of lugs may be used, which would allow a larger opening for dirt or other foreign matter to fall through.

The top tighteners consist of hooks U, beveled, as at $u'$, bolted to a flange $D^5$ on the door, and provided with strengthening-ribs $u$. These hooks enter beveled openings $e^6$ in the top seat-piece $E^2$ and wedge the upper part of the door against its seat.

From the foregoing it will be seen that during the last part of the downward movement of the door the sides are forced against the seat by the action of the rollers Q between the bevel-strips $D^2$ and P, the bottom is forced against the bottom seat-piece $E^3$ by the action of the wedge-shaped lower edge of the door as it enters behind the flap-piece T, while the top is forced against the top seat-piece $E^2$ by the action of the beveled hooks U in the beveled opening $e^6$ of the upper seat-piece, thus pressing all four sides of the door firmly against their respective seats and forming a water-tight door.

It will be obvious that various modifications might be made in the herein-described system and apparatus which could be used without departing from the spirit of my invention.

Having thus described my invention, what I claim, and desire to secure by Letters Patent of the United States, is—

1. In a hydraulic system of the character described, the combination with a receptacle adapted to contain a body of fluid under pressure, and means for regulating the pressure of said fluid, of an emergency-cylinder, with piston therein, and emergency mechanism operated by said piston, pipes respectively connected to each end of said cylinder and adapted to contain fluid under pressure, a fluid-pressure pipe and an exhaust-pipe, and means for connecting the pipe from one end of said cylinder to the fluid-pressure pipe and from the other end of the cylinder to the exhaust-pipe, or vice versa, a door, and means operated by the emergency mechanism for moving said door, with additional means operated by the fluid-pressure and controlled by hand for moving said door independently of the emergency mechanism, substantially as described.

2. In a hydraulic system of the character described, the combination with a receptacle adapted to contain a body of fluid under pressure, and means for regulating the pressure of said fluid, of an emergency-cylinder, with piston therein, pipes respectively connected to each end of said cylinder and adapted to contain fluid under pressure, a fluid-pressure pipe and an exhaust-pipe, and means for connecting the pipe from one end of said cylinder to the fluid-pressure pipe and from the other end of the cylinder to the exhaust-pipe, or vice versa, a fluid-pressure main, branch pipes leading from said main, a bulkhead-door, and mechanism operated by the fluid in said branch pipes for moving said door, and mechanism operated by the piston in the emergency-cylinder for controlling the pressure in all of said branch pipes, substantially as described.

3. In a hydraulic system of the character described, the combination with a receptacle adapted to contain a body of fluid under pressure, and means for regulating the pressure of said fluid, of an emergency-cylinder, with piston therein, pipes respectively connected to each end of said cylinder and adapted to contain fluid under pressure, a fluid-pressure pipe and an exhaust-pipe, and means for connecting the pipe from one end of said cylinder to the fluid-pressure pipe and from the other end of the cylinder to the exhaust-pipe, or vice versa, a fluid-pressure main, branch pipes leading from said main, a bulkhead-door, and mechanism operated by the fluid in said branch pipes for moving said door, mechanism operated by the piston in the emergency-cylinder for controlling the pressure in all of said branch pipes, and a releasing-valve connected to each of said branch pipes and adapted to control the flow of fluid through said branch pipe and thus to control the mechanism operated thereby, substantially as described.

4. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein and emergency mechanism operated by said piston, pipes respectively connected to each end of said cylinder and adapted to contain fluid under pressure, a fluid-pressure pipe, a bulkhead-door, and mechanism operated by fluid-pressure in the system for moving said door, an exhaust-pipe, and means for connecting the pipe from one end of said cylinder to the fluid-pressure pipe and from the other end of the cylinder to the exhaust-pipe, or vice versa, substantially as described.

5. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, an emergency-valve operated by said piston, and a hydraulic system controlled by said emergency-valve, pipes respectively connected to each end of said cylinder and adapted to contain fluid under pressure, a fluid-pressure pipe, a bulkhead-door, and mechanism operated by fluid-pressure in the system for moving said door, an exhaust-pipe, and means for connecting the pipe from one end of said cylinder to the fluid-pressure pipe and from the other end of the cylinder to the exhaust-pipe, or vice versa, substantially as described.

6. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein and emergency mechanism operated by said piston, pipes respectively connected to each end of said cylinder and adapted to contain fluid under pressure, a fluid-pressure pipe, a bulkhead-door, and mechanism operated by fluid-pressure in the system for moving said door, an exhaust-pipe, and a six-way valve for connecting the pipe from one end of said cylinder to the fluid-pressure pipe and from the other end of the cylinder to the exhaust-pipe, or vice versa, substantially as described.

7. In a hydraulic system of the character described, the combination with a receptacle adapted to contain a body of fluid under pressure, and means for regulating the pressure of said fluid, of an emergency-cylinder, with piston therein and emergency mechanism operated by said piston, pipes respectively connected to each end of said cylinder and adapted to contain fluid under pressure, a fluid-pressure pipe, a bulkhead-door, and mechanism operated by fluid-pressure in the system for moving said door, an exhaust-pipe, and a six-way valve for connecting the pipe from one end of said cylinder to the fluid-pressure pipe and from the other end of the cylinder to the exhaust-pipe, or vice versa, substantially as described.

8. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe and an exhaust-pipe, and means for connecting the pipe from one end of said cylinder to the fluid-pressure pipe, and from the other end of the cylinder to the exhaust-pipe, or vice versa, a fluid-pressure main leading from the ram-cylinder, branch pipes leading from said main, bulkhead-doors, and mechanism operated by the fluid in said branch pipes for moving said doors and mechanism operated by the piston in the emergency-cylinder for regulating the pressure in the steam-cylinder and so controlling the pressure in all of said branch pipes, substantially as described.

9. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe connected to said ram-cylinder and an exhaust-pipe, and a six-way valve for connecting the pipe from one end of said cylinder to the fluid-pressure pipe and from the other end of the cylinder to the exhaust-pipe, or vice versa, a fluid-pressure main, leading from the ram-cylinder, branch pipes leading from said main, bulkhead-doors, and mechanism operated by the fluid in said branch pipes for moving said doors, and mechanism operated by the piston in the emergency-cylinder for regulating the pressure in the steam-cylinder and so controlling the pressure in all of said branch pipes, substantially as described.

10. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe connected to said ram-cylinder and an exhaust-pipe, and means for connecting the pipe from one end of the cylinder to the fluid-pressure pipe and from the other end of the cylinder to the exhaust-pipe, or vice versa, a fluid-pressure main leading from the ram-cylinder, branch pipes leading from said main, a plurality of bulkhead-doors, door opening and closing mechanism operated by the fluid in said branch pipes and mechanism operated by the piston in the emergency-cylinder for controlling the pressure in the ram-cylinder and so in all of said branch pipes, substantially as described.

11. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe and an exhaust-pipe, means for connecting the pipe from one end of said cylinder to the fluid-pressure pipe and from the other end of the cylinder to the exhaust-pipe, or vice versa, and means for indicating the flow of fluid through said pipes, a fluid-pressure main leading from the ram-cylinder, branch pipes leading from said main, a plurality of bulkhead-doors, door opening and closing mechanism operated by the fluid in said branch pipes and mechanism operated by the piston in the emergency-cylinder for controlling the pressure in all of said branch pipes, substantially as described.

12. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe and an exhaust-pipe, and means for connecting the pipe from one end of said cylinder to the fluid-pressure pipe and from the other end of the cylinder to the exhaust-pipe, or vice versa, a fluid-pressure main connected to said ram-cylinder, branch pipes leading from said main, bulkhead-doors mechanism operated by the fluid in said branch pipes for moving said doors, mechanism operated by the piston in the emergency-cylinder for controlling the pressure in all of said branch pipes, and a releasing-valve connected to each of said branch pipes and adapted to control the flow of fluid through said branch pipe and to control the mechanism operated thereby, substantially as described.

13. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe and an exhaust-pipe, and means for connecting the pipe from one end of said cylinder to the fluid-pressure pipe and from the other end of the cylinder to the exhaust-pipe, or vice versa, a fluid-pressure main connected to said ram-cylinder, branch pipes leading from said main, a plurality of bulkhead-doors, door opening and closing mechanism operated by the fluid in said branch pipes and mechanism operated by the piston in the emergency-cylinder for controlling the pressure in all of said branch pipes, and a hand-operated releasing-valve connected to each of said branch pipes and adapted to control the flow of fluid through said branch pipe and to control the door opening and closing mechanism operated thereby, substantially as described.

14. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe and an exhaust-pipe, and means for connecting the pipe from one end of said cylinder to the fluid-pressure pipe and from the other end of the cylinder to the exhaust-pipe, or vice versa, a fluid-pressure main connected to said ram-cylinder, branch pipes leading from said main, a plurality of bulkhead-doors, door opening and closing mechanism operated by the fluid in said branch pipes and mechanism operated by the piston in the emergency-cylinder for controlling the pressure in all of said branch pipes, and a hand-operated releasing-valve connected to each of said branch pipes and adapted to control the flow of fluid through said branch pipe and to control the mechanism operated thereby, with springs adapted to automatically return said releasing-valve to the initial position, substantially as described.

15. In a hydraulic system of the character described, the combination with a ram-cylinder adapted to contain a body of fluid under pressure, and a steam-cylinder for exerting pressure upon said fluid, with valves for regulating the said pressure, of an emergency-cylinder, with piston therein, pipes respectively connected to each end of said cylinder and adapted to contain fluid under pressure, a fluid-pressure pipe and an exhaust-pipe, and means for connecting the pipe from one end of said cylinder to the fluid-pressure pipe and from the other end of the cylinder to the exhaust-pipe, or vice versa, a fluid-pressure main connected to said ram-cylinder, branch pipes leading from said main, doors provided with cylinders operated by the fluid in said branch pipes, a valve operated by the piston in the emergency-cylinder for controlling the pressure in the steam-cylinder and thus regulating the pressure in the ram-cylinder and in all of said branch pipes, and a hand-operated releasing-valve connected to each of said branch pipes and adapted to control the flow of fluid through said branch pipe and to control the mechanism operated thereby, substantially as described.

16. In a hydraulic system of the character described, the combination with a source of fluid-pressure, of an accumulator adapted to contain fluid under pressure and itself operated by fluid from the source of fluid-pressure, means for regulating the pressure of the fluid in the accumulator, a fluid-pressure main leading from the accumulator, a branch pipe from said main, a bulkhead-door, and mechanism operated by the fluid in said branch pipe for moving said door, and releasing-valve mechanism located in said branch pipe and operated by hand at low pressures and automatically operated at high pressures, substantially as described.

17. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, means for operating said valve, a bulkhead-door, and mechanism operated by the fluid-pressure from the accumulator for moving said door, substantially as described.

18. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, means for operating said valve, a fluid-pressure main connected to said accumulator, branch pipes connected to said main, bulkhead-doors, and mechanism operated by the fluid-pressure in said branch pipes for moving said doors, substantially as described.

19. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, means for operating said valve, a fluid-pressure main connected to said accumulator, branch pipes connected to said main, bulkhead-doors and door opening and closing mechanism operated by the fluid-pressure in said branch pipes, substantially as described.

20. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, means for operating said valve, a fluid-pressure main connected to said accumulator, branch pipes connected to said main, bulkhead-doors, and mechanism operated by the fluid-pressure in the branch pipes for opening and closing said doors, and a hand-operated releasing-valve in each of said branch pipes, whereby said doors may be operated by hand when desired, substantially as described.

21. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, means for operating said valve, a fluid-pressure main bulkhead-doors connected to said accumulator, branch pipes connected to said main, and door opening and closing mechanism operated by the fluid-pressure in said branch pipes, and a hand-operated releasing-valve in each of said branch pipes, substantially as described.

22. In a hydraulic system of the character described, the combination with a source of fluid-pressure, of an accumulator adapted to contain fluid under pressure and itself operated by fluid from the source of fluid-pressure, a plurality of reducing-valves interposed between the source of fluid-pressure and the accumulator, with a by-pass between said valves and the accumulator, for regulating the pressure of the fluid in the accumulator, a fluid-pressure main leading from the accumulator, a branch pipe from said main, a bulkhead-door, mechanism operated by the fluid in said branch pipe for opening and closing said door, and a releasing-valve located in said branch pipe and operated by hand at low pressures and automatically operated at high pressures, substantially as described.

23. In a hydraulic system of the character described, the combination with a source of fluid-pressure, of an accumulator adapted to contain fluid under pressure and itself operated by fluid from the source of fluid-pressure, a plurality of reducing-valves interposed between the source of fluid-pressure and the accumulator, with a by-pass between said valves and the accumulator, for regulating the pressure of the fluid in the accumulator, a fluid-pressure main leading from the accumulator, a branch pipe from said main, a bulkhead-door, door opening and closing mechanism operated by the fluid in said branch pipe, and a releasing-valve located in said branch pipe and operated by hand at low pressures and automatically operated at high pressures, substantially as described.

24. In a hydraulic system of the character described, the combination with a source of fluid-pressure, of an accumulator adapted to contain fluid under pressure and itself operated by fluid from the source of fluid-pressure, a plurality of reducing-valves interposed between the source of fluid-pressure and the accumulator, with a by-pass between said valves and the accumulator, for regulating the pressure of the fluid in the accumulator, a fluid-pressure main leading from the accumulator, a branch pipe from said main, a sliding door, a cylinder and piston one of which is fast to the door and the other to the framework or bulkhead surrounding the door, and the movable part being operated by the fluid in said branch pipe, and a releasing-valve located in said branch pipe and operated by hand at low pressures and automatically operated at high pressures, substantially as described.

25. In a hydraulic system of the character described, the combination with a source of fluid-pressure, of an accumulator adapted to contain fluid under pressure and itself operated by fluid from the source of fluid-pressure, for regulating the pressure of the fluid in the accumulator, a fluid-pressure main leading from the accumulator, a branch pipe from said main, a bulkhead-door and door opening and closing mechanism operated by the fluid in said branch pipe, and a releasing-valve located in said branch pipe and operated by hand at low pressures and automatically operated at high pressures, substantially as described.

26. In a hydraulic system of the character described, the combination with a source of fluid-pressure, of an accumulator adapted to contain fluid under pressure, means for regulating the pressure of the fluid in the accumulator, a fluid-pressure main leading from the accumulator, a branch pipe from said main, a sliding door, a cylinder and piston one of which is fast to the door and the other to the framework or bulkhead surrounding the door, and the movable part being operated by the fluid in said branch pipe, and a releasing-valve located in said branch pipe and operated by hand at low pressures and automatically operated at high pressures, substantially as described.

27. In a hydraulic system of the character described, the combination with a source of fluid-pressure, of an accumulator adapted to contain fluid under pressure and itself operated by fluid from the source of fluid-pressure, means for regulating the pressure of the fluid in the accumulator, a fluid-pressure main leading from the accumulator, branch pipes from said main, bulkhead-doors, and mechanism operated by the fluid in said branch pipes for moving said doors, and releasing-valves located in each of said branch pipes and separately operated by hand at low pressures and simultaneously automatically operated at high pressures, substantially as described.

28. In a hydraulic system of the character described, the combination with a source of fluid-pressure, of an accumulator adapted to contain fluid under pressure and itself operated by fluid from the source of fluid-pressure, a plurality of reducing-valves interposed between the source of fluid-pressure and the accumulator, with a by-pass between said valves and the accumulator for regulating the pressure of the fluid in the accumulator, a fluid-pressure main leading from the accumulator, branch pipes from said main, bulkhead-doors, and mechanism operated by the fluid in said branch pipes for moving said doors, and releasing-valves located in each of said branch pipes and separately operated by hand at low pressures and simultaneously automatically operated at high pressures, substantially as described.

29. In a hydraulic system of the character described, the combination with a source of fluid-pressure, of an accumulator adapted to contain fluid under pressure and itself operated by fluid from the source of fluid-pressure, means for regulating the pressure of the fluid in the accumulator, a fluid-pressure main leading from the accumulator, branch pipes from said main, bulkhead-doors, and door opening and closing mechanism operated by the fluid in said branch pipes, and releasing-valves located in each of said branch pipes and separately operated by hand at low pressures and simultaneously automatically operated at high pressures, substantially as described.

30. In a hydraulic system of the character described, the combination with a source of fluid-pressure, of an accumulator adapted to contain fluid under pressure and itself operated by fluid from the source of fluid-pressure, means for regulating the pressure of the fluid in the accumulator, a fluid-pressure main leading from the accumulator, branch pipes from said main, a sliding door, a cylinder attached to said door, a fixed piston, and a hollow piston-rod connected to said branch pipe and opening into the cylinder, whereby the door is operated by the fluid in said branch pipes, and releasing-valves located in each of said branch pipes and separately operated by hand at low pressures and simultaneously automatically operated at high pressures, substantially as described.

31. In a hydraulic system of the character described, the combination with a source of fluid-pressure, of an accumulator adapted to contain fluid under pressure and itself operated by fluid from the source of fluid-pressure, means for regulating the pressure of the fluid in the accumulator, a fluid-pressure main leading from the accumulator, branch pipes from said main, a sliding door, a cylinder attached to said door, a fixed piston, and a hollow piston-rod connected to said branch pipe and opening into the cylinder, whereby the door is operated by the fluid in said branch pipes, and releasing-valves located in each of said branch pipes and separately operated by hand at low pressures and simultaneously automatically operated at high pressures, substantially as described.

32. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, means for operating said valve, bulkhead-doors, and door opening and closing mechanism operated by the fluid-pressure from the accumulator, substantially as described.

33. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, a hydraulic system for operating said valve, bulkhead-doors, and door opening and closing mechanism operated by the fluid-pressure from the accumulator, substantially as described.

34. In a hydraulic system of the character described, the combination with a source of fluid-pressure, of an accumulator adapted to contain a body of fluid under pressure, a pair of reducing-valves for regulating the admission of fluid-pressure from said source to said accumulator, a by-pass opening from between said reducing-valves into said accumulator, a valve controlling said by-pass, a hydraulic system operated by pressure from the accumulator for operating said valve, a fluid-pressure main connected to said accumulator, branch pipes connected to said main, bulkhead-doors and mechanism operated by the fluid-pressure in said branch pipes for moving said doors, substantially as described.

35. In a hydraulic system of the character described, the combination with a source of fluid-pressure, of an accumulator adapted to contain a body of fluid under pressure, a plurality of reducing-valves for regulating the admission of fluid-pressure from said source to said accumulator, a by-pass opening from between said reducing-valves into said accumulator, a valve controlling said by-pass, a hydraulic system operated by pressure from the accumulator for operating said valve, a fluid-pressure main connected to said accumulator, branch pipes connected to said main, bulkhead-doors and door opening and closing mechanism operated by the fluid-pressure in said branch pipes, substantially as described.

36. In a hydraulic system of the character described, the combination with a fluid-pressure main and a branch pipe leading therefrom, and means for raising and lowering the pressure in said main, of a bulkhead-door, and door opening and closing mechanism operated by the pressure in said branch pipe, and a releasing-valve located in said branch pipe, and adapted to be operated by hand at all pressures and to be operated automatically at high pressures only, substantially as described.

37. The combination with a frame secured to the bulkhead and provided with guides for the edges of the door, of a door sliding in said guides and provided with a plurality of inclined bearing-surfaces with projections at the base of said surfaces, a plate sliding between said inclined surfaces and the frame and itself having inclined surfaces oppositely disposed to those on the door, balls or rollers interposed between the inclined surfaces on the door and on the said plate, and means for starting the door before said plate, in opening the door, and for stopping the door after said plate, in closing the door, substantially as described.

38. The combination with a frame secured to the bulkhead and provided with guides for the edges of the door, of a door sliding in said guides and provided with a plurality of inclined bearing-surfaces with projections at the base of said surfaces, a plate sliding between said inclined surfaces and the frame and itself having inclined surfaces oppositely disposed to those on the door, balls or rollers interposed between the inclined surfaces on the door and on the said plate, and a pivoted toe adapted to lock said plate against motion when the door is in the early stages of opening or the late stages of closing, substantially as described.

39. The means for tightening the sides of a sliding door which consists in providing oppositely-inclined surfaces on the door and next the framework, with balls or rollers interposed between the said oppositely-inclined surfaces, substantially as and for the purposes described.

40. The means for tightening the bottom or edge of a sliding door comprising a wedge-shaped heel-piece on the door and a pivoted flap-piece adapted to engage the said heel-piece, substantially as described.

41. The means for tightening the bottom or edge of a sliding door comprising a wedge-shaped heel-piece on the door, and a pivoted flap-piece adapted to engage the said heel-piece, with inclined inner face, and springs normally pressing said inner face against the door-sill when the door is open, substantially as described.

42. The means for tightening the bottom or edge of a sliding door comprising a wedge-shaped heel-piece on the door and a pivoted flap-piece adapted to engage the said heel-piece, with inclined inner face, and springs normally pressing said inner face against the door-sill when the door is open, and rollers engaging said heel-piece and pressing said flap-piece back against the action of said springs as the door descends, substantially as described.

43. The means for tightening the top or edge of a sliding door which comprise wedge-shaped rib or ribs secured to the door-frame and a hook or hooks secured to the door and adapted to engage said rib or ribs when the door nears the closed position, substantially as described.

44. In a hydraulic system for opening and closing sliding doors or moving other bodies, the combination with a supply-pipe from the source of fluid-pressure, and an exhaust-pipe, of a fixed hollow piston-rod with separate passages therethrough to the upper and lower sides of the piston, respectively, a cylinder secured to the door or other body to be moved, double pipes connecting the passages in the piston-rod to the supply-pipe, and a four-way valve for connecting one of the passages in the piston-rod to the supply-pipe, and the other to the exhaust, or vice versa, substantially as described.

45. In a hydraulic system for opening and closing sliding doors or moving other bodies, the combination with a supply-pipe from the source of fluid-pressure, and an exhaust-pipe, of a fixed hollow piston-rod with separate passages therethrough to the upper and lower sides of the piston, respectively, a cylinder secured to the door or other body to be moved, double pipes connecting the passages in the piston-rod to the supply-pipe, and a four-way valve for connecting one of the passages in the piston-rod to the supply-pipe, and the other to the exhaust, or vice versa, with means for operating this valve by hand at all pressures, or automatically at high pressures only, substantially as described.

46. In a hydraulic system for opening and closing sliding doors, the combination with a door and rigid guides therefor, of a supply-pipe from the source of fluid-pressure and an exhaust-pipe, a fixed hollow piston-rod with separate passages therethrough to the upper and lower sides of the piston, respectively, a cylinder secured to the door, double pipes connecting the passages in the piston-rod to the supply-pipe, a four-way valve for connecting one of the passages in the piston-rod to the supply-pipe, and the other to the exhaust, or vice versa, and tightening devices automatically operated by the motion of the door, substantially as described.

47. In a hydraulic system for opening and closing sliding doors, the combination with a door and rigid guides therefor, of a supply-pipe from the source of fluid-pressure and an exhaust-pipe, a fixed hollow piston-rod with separate passages therethrough to the upper and lower sides of the piston, respectively, a cylinder secured to the door, double pipes connecting the passages in the piston-rod to the supply-pipe, a four-way valve for connecting one of the passages in the piston-rod to the supply-pipe, and the other to the exhaust, or vice versa, and tightening devices automatically operated by the motion of the door, with means for operating this valve by hand at all pressures, or automatically at high pressures only, substantially as described.

In testimony whereof I affix my signature in presence of two witnesses.

WM. BARNUM COWLES.

Witnesses:
　FREDERICK C. HIBLO,
　GEORGE RETTIG.